United States Patent
Lee (10) Patent No.: US 11,188,715 B2
(45) Date of Patent: Nov. 30, 2021

(54) METHODS FOR DISPLAYING A STRING OF TEXT AND WEARABLE DEVICES

(71) Applicant: RAZER (ASIA-PACIFIC) PTE. LTD., Singapore (SG)

(72) Inventor: Kah Yong Lee, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 143 days.

(21) Appl. No.: 16/472,058

(22) PCT Filed: Dec. 28, 2016

(86) PCT No.: PCT/SG2016/050623
§ 371 (c)(1),
(2) Date: Jun. 20, 2019

(87) PCT Pub. No.: WO2018/124965
PCT Pub. Date: Jul. 5, 2018

(65) Prior Publication Data
US 2020/0097543 A1    Mar. 26, 2020

(51) Int. Cl.
*G06F 40/289* (2020.01)
*G06F 40/103* (2020.01)
*G06F 40/263* (2020.01)

(52) U.S. Cl.
CPC .......... *G06F 40/289* (2020.01); *G06F 40/103* (2020.01); *G06F 40/263* (2020.01)

(58) Field of Classification Search
USPC ................................................ 704/1–504, 9
See application file for complete search history.

(56) References Cited

U.S. PATENT DOCUMENTS

| | | | |
|---|---|---|---|
| 6,292,176 B1 | 9/2001 | Reber et al. | |
| 8,965,129 B2 | 2/2015 | Rogowski et al. | |
| 9,966,065 B2 | 5/2018 | Gruber et al. | |
| 10,405,786 B2* | 9/2019 | Sahin | A61B 5/165 |
| 2002/0133521 A1 | 9/2002 | Campbell et al. | |
| 2007/0218432 A1 | 9/2007 | Glass et al. | |
| 2013/0090917 A1* | 4/2013 | Chalmers | G06F 40/166 |
| | | | 704/9 |

(Continued)

FOREIGN PATENT DOCUMENTS

| | | |
|---|---|---|
| EP | 2872984 A1 | 5/2015 |
| GB | 2420476 A | 5/2006 |

(Continued)

OTHER PUBLICATIONS

International Search Report and Written Opinion, dated Sep. 19, 2017, for the corresponding International Application No. PCT/SG2016/050623 in 10 pages.

(Continued)

*Primary Examiner* — Marcus T Riley
(74) *Attorney, Agent, or Firm* — Polsinelli PC (57) ABSTRACT

According to various embodiments, there is provided a method for displaying a string of text, the method including: dividing the string of text into a plurality of substrings; and for each substring of the plurality of substrings: determining a complexity index of the substring; determining a display duration of the substring based on the determined complexity index; and displaying the substring for the determined display duration.

19 Claims, 4 Drawing Sheets

(56) References Cited

U.S. PATENT DOCUMENTS

| | | | |
|---|---|---|---|
| 2013/0100139 A1 | 4/2013 | Schliesser et al. | |
| 2013/0231918 A1 | 9/2013 | Roloff et al. | |
| 2013/0273976 A1 | 10/2013 | Rao et al. | |
| 2015/0099946 A1* | 4/2015 | Sahin .................... | G16H 50/20 |
| | | | 600/301 |
| 2015/0347075 A1 | 12/2015 | Levesque et al. | |
| 2015/0348551 A1* | 12/2015 | Gruber ............... | H04M 3/4936 |
| | | | 704/235 |
| 2015/0363954 A1 | 12/2015 | Maurer et al. | |
| 2016/0182435 A1 | 6/2016 | Landqvist et al. | |
| 2016/0239091 A1 | 8/2016 | Forutanpour et al. | |
| 2016/0253831 A1* | 9/2016 | Schwarz .............. | G06F 40/109 |
| | | | 345/467 |
| 2017/0177743 A1* | 6/2017 | Bhattacharjee ... | G06F 16/90344 |
| 2020/0097543 A1* | 3/2020 | Lee ...................... | G06F 40/263 |

FOREIGN PATENT DOCUMENTS

| | | |
|---|---|---|
| TW | 525083 B | 3/2003 |
| TW | 201612773 A | 4/2016 |
| WO | WO 02/37256 A2 | 5/2002 |
| WO | WO 2002/037256 | 5/2002 |
| WO | WO 2015/195833 A1 | 12/2015 |

OTHER PUBLICATIONS

Extended European Search Report dated Nov. 13, 2019, 7 pages, for the corresponding European Patent Application No. 16925684.9.
Office Action (including English Translation) dated Sep. 3, 2021, for the corresponding Taiwanese Application No. 106144849 in 17 total pages.

* cited by examiner

METHODS FOR DISPLAYING A STRING OF TEXT AND WEARABLE DEVICES

TECHNICAL FIELD

Various embodiments relate to methods for displaying a string of text and wearable devices.

BACKGROUND

Intelligent wearable devices such as smart wristbands and smart watches have been gaining popularity amongst consumers. These wearable devices are typically equipped with a digital display area for displaying information, for example, activity menus and notification messages. As wearable devices are designed to be compact, lightweight and aesthetically pleasing, the amount of physical space available on the wearable device for the display area is usually small. It may be difficult to fit text information into a small display area. To overcome this problem, the text information may be scrolled on the display area, for example, like a news ticker, in order to display the entire text information. On one hand, it may be difficult for users to read the text information if the text is moved along on the display area quickly and yet on the other hand, if the text is moved along slowly across the display area, a paragraph of text information may take a long time to be fully displayed. Therefore, there is a need for an effective method of displaying the text information on the display area.

SUMMARY

According to various embodiments, there may be provided a method for displaying a string of text, the method including: dividing the string of text into a plurality of substrings; and for each substring of the plurality of substrings: determining a complexity index of the substring; determining a display duration of the substring based on the determined complexity index; and displaying the substring for the determined display duration.

According to various embodiments, there may be provided a wearable device including: a processor configured to divide a string of text into a plurality of substrings, wherein the processor is further configured to determine a complexity index of each substring of the plurality of substrings, and further configured to determine a display duration of each substring of the plurality of substrings based on the respective determined complexity index; and a display configured to display each substring of the plurality of substrings for the respective determined display duration.

According to various embodiments, there may be provided a non-transitory computer-readable medium comprising instructions which, when executed by a processor, causes the processor to perform a method for displaying a string of text, the method including: dividing the string of text into a plurality of substrings; and for each substring of the plurality of substrings: determining a complexity index of the substring; determining a display duration of the substring based on the determined complexity index; and displaying the substring for the determined display duration.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or processes described must be enclosed in the device or method, but only some (but not all) components or processes may be enclosed.

In this context, the wearable device as described in this description may include a memory which is for example used in the processing carried out in the wearable device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In the specification the term "comprising" shall be understood to have a broad meaning similar to the term "including" and will be understood to imply the inclusion of a stated integer or process or group of integers or processes but not the exclusion of any other integer or process or group of integers or processes. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any prior art in this specification is not, and should not be taken as an acknowledgement or any form of suggestion that the referenced prior art forms part of the common general knowledge in Australia (or any other country).

In order that the invention may be readily understood and put into practical effect, various embodiments will now be described by way of examples and not limitations, and with reference to the figures.

Intelligent wearable devices such as smart wristbands and smart watches have been gaining popularity amongst consumers. These wearable devices are typically equipped with a digital display area for displaying information, for example, activity menus and notification messages. As wearable devices are designed to be compact, lightweight and aesthetically pleasing, the amount of physical space available on the wearable device for the display area is usually small. It may be difficult to fit text information into a small display area. To overcome this problem, the text information may be scrolled on the display area, for example, like a news ticker, in order to display the entire text information. On one hand, it may be difficult for users to read the text information if the text is moved along on the display area quickly and yet on the other hand, if the text is moved along slowly across the display area, a paragraph of text information may take a long time to be fully displayed. Therefore, there is a need for an effective method of displaying the text information on the display area.

According to various embodiments, a method for displaying a string of text may include flashing (in other words: displaying) a word or a phrase, one at a time on a small screen. The flashing words or phrases may collectively form the single string of text or information. The method may solve the problem of having to show a large amount of text to a user, using a small screen. The word or phrase may be displayed on the small screen, one at a time. Each word or phrase may be associated with a respective complexity index. Each word or phrase may remain on the small screen for a short time duration, for example, a fraction of a second. The duration of displaying each word or phrase may depend on the complexity of the respective word or phrase, as well as the word or phrase before and after the respective word or phrase. The process of displaying a word or phrase according to its complexity and the complexity of its neighboring text, may repeat until the end of the string of text. The method may further include smoothening the delay effect between the words or phrases. For example, an additional duration may be added to the display time of a word or phrase if the complexity difference between the current and previous or next words or phrases is more than a predetermined threshold. Each word or phrase may be displayed according to the display duration that is modified based on the smoothening process. The method may provide an effective and elegant method to display a large amount of text on a small screen.

According to various embodiments, the determination (in other words: computation) of the complexity index may be based on various factors. A factor may be the length of the substring, i.e. the number of characters in the substring. A longer substring may contribute to a higher complexity index. Another factor may be the frequency of occurrence of the word or phrase of the substring in common language usage. This factor may be based on a database representing common language usage of the language in which the string of text is written. For example, if the string of text conveys information in English, it may be determined how often the words of the substring are used in common English usage, by referring to a database containing statistics on English words usage. A rarely used word or phrase in the substring may contribute to a higher complexity index. Another factor may be the nature of the word or phrase of the substring, for example whether the substring contains esoteric words or phrases. Jargon words such as scientific terms, academic terms or financial terms may be deemed to have a higher complexity index. The factors may also be customized to a user's profile such as the frequency of occurrence of words in the messages that the user receives or the user's personalized settings. For example, if the user subscribes to stock alerts, the messages received may often contain related terminology such as "SGX, "dividend", "REIT". While these words may be typically considered to be complex, the user may decide to enable a personalized setting such that the complexity index is determined based on the user's familiarity with these words. Also, the personalized settings may enable the user to identify certain words or characters, or categories of words as being more complex or less complex. The user may manually enter certain words and their associated complexity indices. For example, a dyslexic user may find some letters to be more difficult to read and may personalise the wearable device to determine substrings containing those letters to have a higher complexity index.

According to various embodiments, the method for displaying a string of text may be applied to displaying text of any language. The method may include detecting a language of the string of text. The process of dividing the string of text into substrings of words or phrases may depend on the detected language. If the detected language belongs to the alphabetic writing system, for example English language, each word may be an ordered set of alphabetical letter or character. Each word may be identified as a continuous string of characters that does not include a space symbol. If the detected language belongs to the logographic writing system, for example the Chinese language, each word may be a single character. Also, the string of text may not include any space symbols to denote separation between words. Each word may be identified as a single character.

Figure 1:
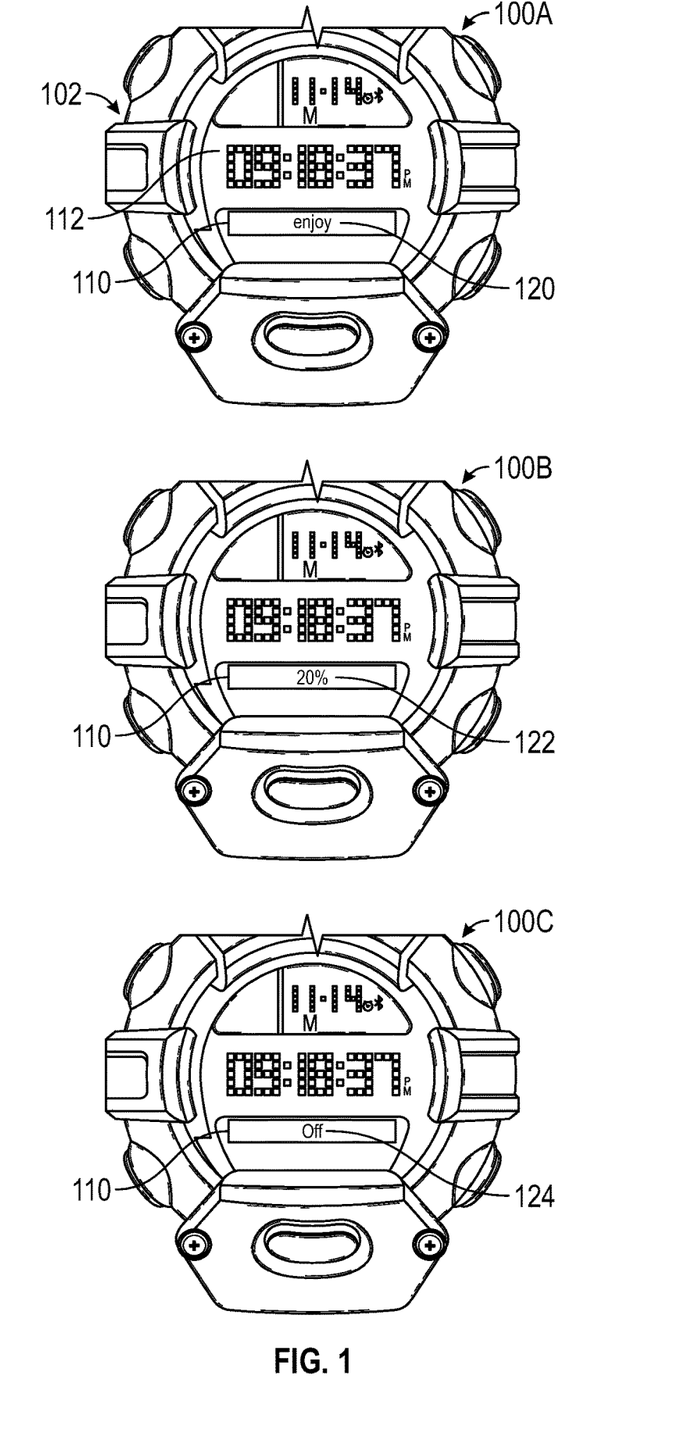
FIG. 1 shows a series of pictures depicting a wearable device according to various embodiments.

FIG. 1 shows a series of pictures 100A-100C depicting a wearable device 102 according to various embodiments. The wearable device 102 shown in FIG. 1 is a smart watch but the wearable device 102 may be any type of wearable devices such as an exercise tracker or a wristband. The wearable device 102 may include a primary display 112 which may be configured to display primary information. The primary information may be related to the primary function of the wearable device 102. For example, if the wearable device 102 is a smart watch, the primary display 112 may be configured to display time. The wearable device 102 may also include a display area 110. The display area 110 may also be referred herein simply as a "display". The display area 110 may be configured to display a string of text, which may be a message like a short message service (SMS) or an instant messaging (IM) message, or a menu or a notification. The display area 110 may be a small screen, due to the limited face area of the wearable device 102. As such, a string of text may not be displayable in its entirety on the display area 110. The wearable device 102 may include a processor. The processor may break down the string of text into its constituent words or phrases. The display area 110 may then display the constituent words or phrases one at a time, sequentially. In other words, the constituent words or phrases may each be flashed on the display area 110 for a respective time duration. The time duration for which each word or phrase is displayed, may be based on a complexity of the word or phrase. The complexity may be indicative of an amount of time that the user would require to read and understand the word or phrase. For example, if the word or phrase is long, difficult to read, is uncommonly used in the language or is infrequently used by the user of the wearable device, the word or phrase may be displayed for a longer time.

As an illustrative example, pictures 100A-100C depict how a message "enjoy 20% off" may be displayed on the display area 110. In the first picture 100A, the display area 110 shows the first word 120, "enjoy". The first word 120 may be displayed for a first time duration. In the second picture 100B, the display area 110 shows the second word 122, "20%". The second word 122 may be displayed for a second time duration. In the third picture 100C, the display area 110 shows the third word 124, "off". The third word 124 may be displayed for a third time duration. The processor may determine a complexity index of each of the first word 120, the second word 122 and the third word 124. As an example, the third word 124 "off" may be determined to have a lower complexity index than the first word 120 "enjoy", as it is a shorter word. Consequently, the third time duration may be shorter than the second time duration. As a further example, the second word 122 "20%" may be determined to have a higher complexity index than the third word 124 "off" even though they have the same number of characters, as the second word 122 contains a mixture of numerals and a symbol whereas the third word 124 only contains alphabet letters. Consequently, the second time duration may be longer than the third time duration.

Figure 2:
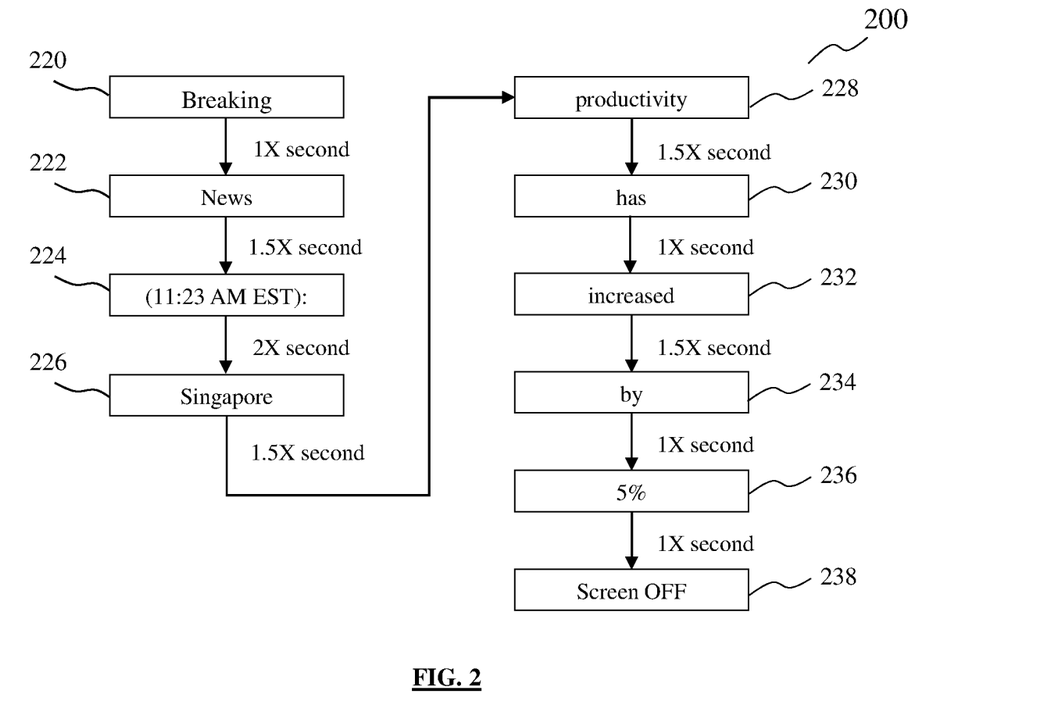
FIG. 2 shows a flow diagram showing an example of how a string of text may be displayed, according to various embodiments.

FIG. 2 shows a flow diagram 200 showing an example of how a string of text may be displayed, according to various embodiments. The text may be displayed on a wearable device. In the example shown in FIG. 2, the string of text is "Breaking News (11:23 AM EST): Singapore productivity has increased by 5%". The string of text may be divided or separated into a plurality of substrings. Each substring may include at least a word or a phrase. As an example, the string of text may be divided into the following substrings: "Breaking" 220, "News" 222, "(11:23 AM EST):" 224, "Singapore" 226, "productivity" 228, "has" 230, "increased" 232, "by" 234 and "5%" 236. A respective complexity index may be computed for each of the substrings. Time duration for each substring may be computed based on its respective complexity index. The computed time duration may be adjusted, according to at least one of the preceding substring or the succeeding substring. The substrings may be displayed sequentially, i.e. in accordance with their inherent order within the string of text. Each substring may be displayed for the adjusted time duration. As the display time duration of each substring may be short, the substrings may appear to "flash" on the display, one after another. As can be seen in the flow diagram 200, the substring "Breaking" 220 may be displayed for 1 unit of time. Next, the substring "Breaking" 220 may cease to be displayed and instead, the substring "News" may be displayed for 1.5 units of time. Next, the substring "(11:23 AM EST):" 224 may be displayed for 2 units of time, followed by the substring "Singapore" 226 for 1.5 units of time and then the substring "productivity" 228 for 1.5 units of time. Next, the substring "has" 230 may be displayed for 1 unit of time, followed by 1.5 units of time of displaying the substring "increased" 232. Next, the substring "by" 234 may be displayed for 1 unit of time, followed by the substring "5%" 236 for 1 unit of time. The duration per unit of time may be user-configurable to suit the user's reading speed. For instance, a fast reader may set the unit of time to 0.2 seconds whereas a moderate reader may set it to 0.5 seconds. After the last substring "by" 234 is displayed, all of the substrings of the string of text have been displayed and the wearable display may proceed to Screen Off mode 238 where the screen or display area is turned off or is blank.

Figure 3:
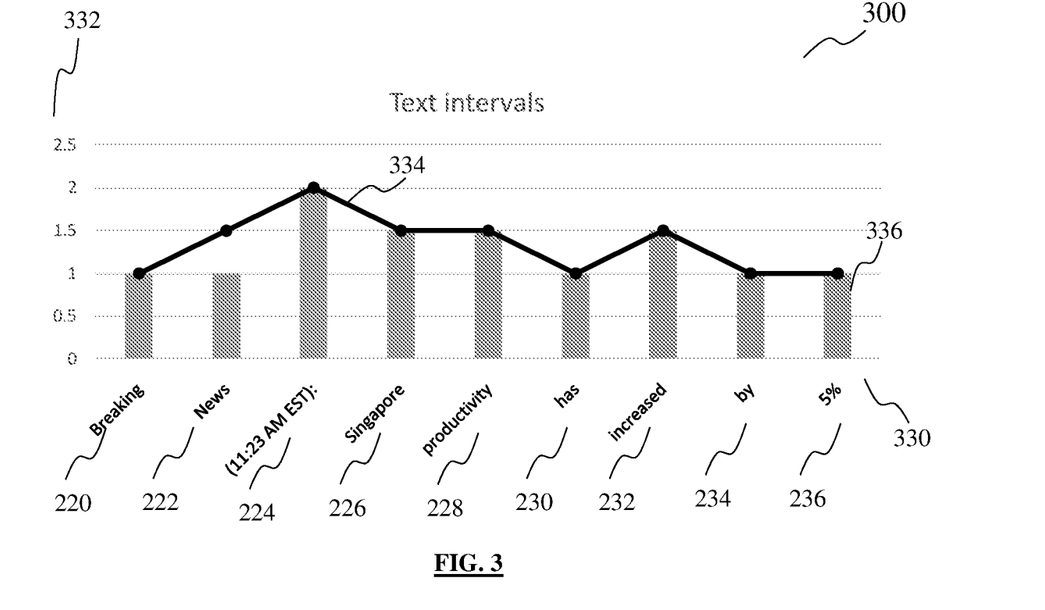
FIG. 3 shows a chart of the computed time duration and adjusted time duration for the substrings shown in FIG. 2.

FIG. 3 shows a chart 300 of the computed time duration and adjusted time duration for the substrings shown in FIG. 2. The chart 300 includes a vertical axis 332 indicating the number of units of time. The chart 300 also includes a horizontal axis 330 indicating the various substrings. The chart 300 also includes bars 336 which represent the computed time duration for each substring. The computed time duration may be computed based on how complex the substring is, i.e. the complexity index of the substring. The chart 300 also includes a line chart 334 which represents the adjusted time duration for each substring. The adjusted time duration may be computed based on the computed time duration, and at least one of the preceding substring or the succeeding substring. The adjusted time duration may be, in some instances, such as for the substrings 220, 224, 226, 228, 230, 232, 234 and 236, be exactly the same as the computed time duration. The adjusted time duration may also be, in some instances, such as for substring 222, different from the computed time duration. The time duration may be adjusted so that the difference between any two successive display time durations is not too large. If a first display time duration is very long but the second display time duration is very short, the user's mind may not be able to react in time to read the second substring. Therefore, the computed time duration may be adjusted if the difference between the computed time duration and the computed time duration for the succeeding substring is larger than a predetermined threshold. The computed time duration may also be adjusted if the difference between the computed time duration and the computed time duration for the preceding substring is larger than the predetermined threshold, or if the difference between the computed time duration for the preceding substring and the computed time duration for the succeeding substring exceeds the predetermined threshold. As shown in the chart 300, the computed time duration for the substring "News" 222 is 1 unit of time, while the computed time duration for the substring "(11:23 AM EST):" 224 is 2 units of time. In the event that the predetermined threshold is 1, the computed time duration for the substring "News" 222 may be adjusted to reduce the difference in computed time duration for the substring "News" 222 and for the substring "(11:23 AM EST):" 224. The display time duration for the substring "News" 222 may be adjusted to 1.5 units of time as a result.

Figure 4:
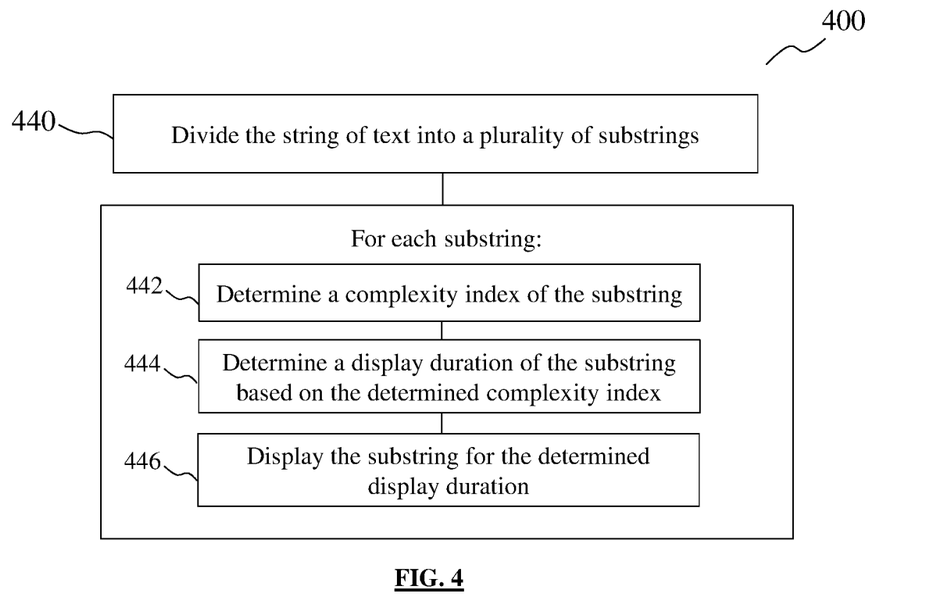
FIG. 4 shows a flow diagram showing a method for displaying a string of text according to various embodiments.

FIG. 4 shows a flow diagram 400 showing a method for displaying a string of text according to various embodiments. The method shown herein may display a string of text according to the flow diagram 200. The method may include 440, in which the string of text may be divided into a plurality of substrings. For each substring, further processes 442, 444 and 446 may be carried out. In 442, a complexity index of the substring may be determined. In 444, a display duration of the substring may be determined based on the determined complexity index. In 446, the substring may be displayed for the determined display duration.

In other words, according to various embodiments, a method for displaying a string of text may include separating the string of text into a plurality of substrings. Each substring may include at least one word or may include a phrase. The substrings may form the string of text when they are assembled together. Separating the string of text into the substrings may include identifying words or phrases in the string of text. For example, spaces, i.e. space symbols may be recognized in the string of text. Uninterrupted strings of characters may be identified by identifying strings of characters that are at least one of between two space symbols, between a start of the string and one space symbol, or between one space symbol and an end of the string of text. The identified strings of characters may be classified as words. The identified words need not necessarily be officially recognized words and need not be words that can be found in a dictionary. The identified words may merely be a collection of characters that are not separated by space symbols. Phrases may include a plurality of identified words. Phrases may be identified by matching successive identified words against predefined phrases in a language database. The language database may be obtained from a dictionary or an open source database, and may be customizable by the user. The method may further include determining a complexity index of each substring of the plurality of substrings. The display duration of each substring may be determined based on the respective determined complexity index. The display duration of each substring may be at least substantially proportional to the respective determined complexity index. As the complexity index of the substring may be related to the length of the substring, determining the complexity index may involve counting a number of characters in the substring. The complexity index may also be determined based on a frequency of occurrence of the substring in common language usage. The frequency of occurrence of the substring may be found in the abovementioned language database. The database may be representative of common language usage. The complexity index may also be determined by classifying the substring into one category of a plurality of categories, such as academic vocabulary, technical vocabulary and common vocabulary. Each category may be associated with a respective complexity index or a respective factor for determining the complexity index. The substring may then be displayed for the determined display duration. The substring may be displayed after a preceding substring has ceased to be displayed. The process of determining the complexity index, determining the display duration and displaying the substring may be repeated for each substring of the plurality of substrings.

Figure 5:
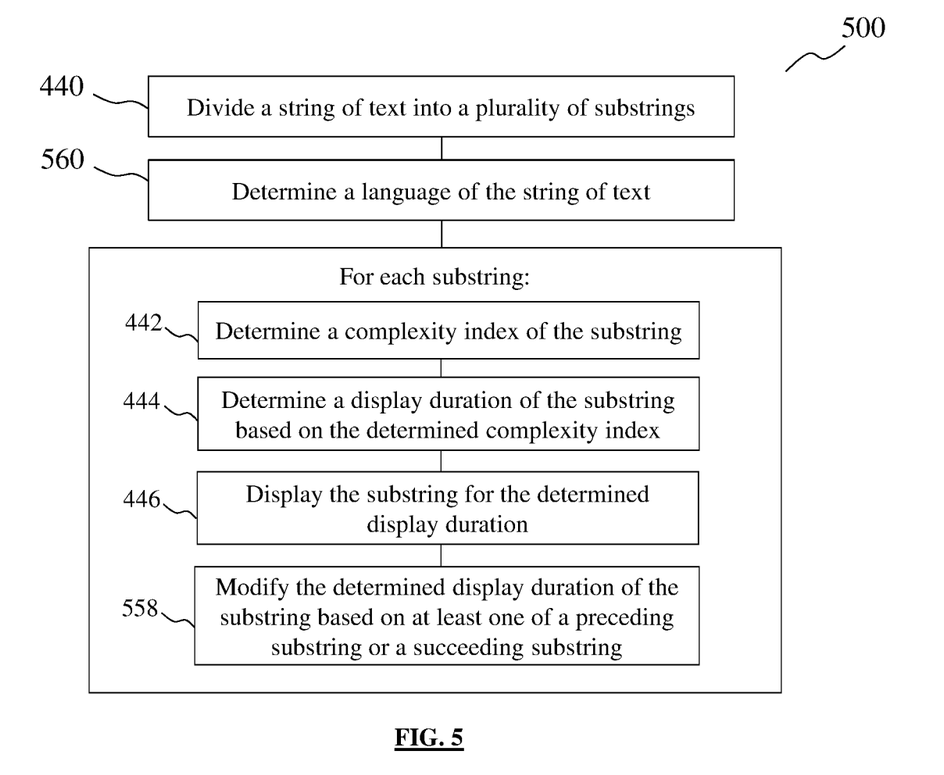
FIG. 5 shows a flow diagram showing a method for displaying a string of text according to various embodiments.

FIG. 5 shows a flow diagram 500 showing a method for display text according to various embodiments. The method may be similar to the method shown in the flow diagram 400, in that it may include 440, 442, 444 and 446. The method may further include 558 and 560. In 558, for each substring, the determined display duration of the substring may be modified based on at least one of a preceding substring or a succeeding substring. The determined display duration may be modified based on the difference between the complexity index of the substring and the complexity of the preceding substring, or may be based on the determined display duration of the preceding substring. The determined display duration may also be modified based on the difference between the complexity of the substring and the complexity index of the succeeding substring, or may be based on the determined display duration of the succeeding substring. The determined display duration may be modified by increasing the determined display duration when the determined display duration of the preceding substring and the determined duration of the succeeding substring is more than a predetermined threshold. The predetermined threshold may be user-configurable. The plurality of substrings may be displayed successively by flashing each substring for a duration equal to its respective determined display duration or its respective modified display duration. The plurality of substrings may be successively displayed according to a sequence of the substrings within the string of text. In 560, a language of the string of text may be determined. The correct database representing common language usage may be identified based on the determined language.

Figure 6:
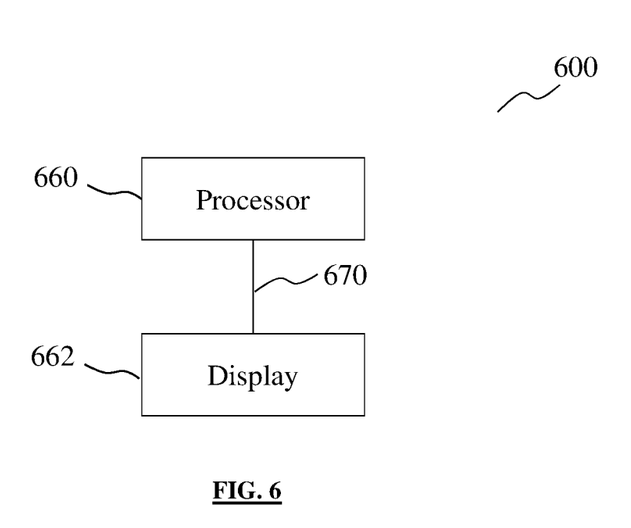
FIG. 6 shows a conceptual diagram of a wearable device according to various embodiments.

FIG. 6 shows a conceptual diagram of a wearable device 600 according to various embodiments. The wearable device 600 may be the wearable device 102. The wearable device 600 may include a processor 660 and a display 662. The processor 660 may be configured to divide a string of text into a plurality of substrings. The processor 660 may be further configured to determine a complexity index of each substring of the plurality of substrings and may be further configured to determine a display duration of each substring based on the respective determined complexity index. The display 662 may be configured to display each substring for a duration equal to the respective determined display duration, after a display duration of the preceding substring has ended. The processor 660 and the display 662 may be coupled with each other, like indicated by line 670, for example electrically coupled, for example using a line or a cable, and/or mechanically coupled. The wearable device may be one of a fitness tracker, an activity tracker, a health monitor, a watch, a communication device or a media player.

According to various embodiments, a non-transitory computer readable medium may be provided. The non-transitory computer readable medium may include instructions which may be executed by a processor to cause the processor to perform a method for displaying a string of text. The method for displaying the string of text may be the method shown in flow diagrams 400 or 500.

The following examples pertain to further embodiments.

Example 1 is a method for displaying a string of text, the method including: dividing the string of text into a plurality of substrings; and for each substring of the plurality of substrings: determining a complexity index of the substring; determining a display duration of the substring based on the determined complexity index; and displaying the substring for the determined display duration.

In example 2, the subject-matter of example 1 can optionally include that the substring is displayed after a preceding substring has ceased to be displayed.

In example 3, the subject-matter of example 1 or example 2 can optionally include that the determined display duration of the substring is at least substantially proportional to the determined complexity index.

In example 4, the subject-matter of any one of examples 1 to 3 can optionally include that each substring of the plurality of substrings includes at least one word.

In example 5, the subject-matter of any one of examples 1 to 4 can optionally include that dividing the string of text into the plurality of substrings includes identifying words in the string of text.

In example 6, the subject-matter of example 5 can optionally include that identifying words in the string of text includes recognizing space symbols in the string of text; identifying strings of characters that are at least one of between two space symbols, between a start of the string of text and one space symbol, or between one space symbol and an end of the string of text; and classifying the identified strings of characters as words.

In example 7, the subject-matter of example 5 or example 6 can optionally include identifying phrases in the string of text, wherein each phrase includes a plurality of identified words.

In example 8, the subject-matter of example 7 can optionally include that identifying phrases in the string of text includes matching successive identified words against predefined phrases in a language database.

In example 9, the subject-matter of any one of examples 1 to 8 can optionally include that determining the complexity index of the substring includes determining a number of characters in the substring.

In example 10, the subject-matter of any one of examples 1 to 9 can optionally include that determining the complexity index of the substring includes determining a frequency of occurrence of the substring in a database representing common language usage.

In example 11, the subject-matter of any one of examples 1 to 10 can optionally include that determining the complexity index of the substring includes classifying the substring into a category out of a plurality of categories, the plurality of categories including at least one of academic vocabulary, technical vocabulary and common vocabulary.

In example 12, the subject-matter of example 11 can optionally include that each category is associated with a respective complexity index.

In example 13, the subject-matter of any one of examples 1 to 12 can optionally include determining a language of the string of text.

In example 14, the subject-matter of any one of examples 1 to 13 can optionally include for each substring of the plurality of substrings: modifying the determined display duration of the substring based on at least one of a preceding substring or a succeeding substring.

In example 15, the subject-matter of example 14 can optionally include that modifying the determined display duration of the substring is based on at least one of a difference between the complexity index of the substring and the complexity index of the preceding substring, or a difference between the complexity index of the substring and the complexity index of the succeeding substring.

In example 16, the subject-matter of example 14 or example 15 can optionally include that modifying the determined display duration of the substring is based on at least one of the determined display duration of the preceding substring or the determined display duration of the succeeding substring.

In example 17, the subject-matter of example 16 can optionally include that modifying the determined display duration of the substring includes increasing the determined display duration when the difference between the determined display duration of the preceding substring and the determined display duration of the succeeding substring is more than a predetermined threshold.

In example 18, the subject-matter of any one of examples 1 to 17 can optionally include that the plurality of substrings are successively displayed according to a sequence of the substrings within the string of text.

Example 19 is a wearable device including: a processor configured to divide a string of text into a plurality of substrings, wherein the processor is further configured to determine a complexity index of each substring of the plurality of substrings, and further configured to determine a display duration of each substring of the plurality of substrings based on the respective determined complexity index; and a display configured to display each substring of the plurality of substrings for the respective determined display duration.

In example 20, the subject-matter of example 19 can optionally include that the processor is further configured to control the display to display each substring after a display duration of a preceding substring has ended.

In example 21, the subject-matter of example 19 or example 20 can optionally include that the wearable device is one of a fitness tracker, an activity tracker, a health monitor, a watch, a communication device or a media player.

Example 22 is a non-transitory computer-readable medium including instructions which, when executed by a processor, causes the processor to perform a method for displaying a string of text, the method including: dividing the string of text into a plurality of substrings; and for each substring of the plurality of substrings: determining a complexity index of the substring; determining a display duration of the substring based on the determined complexity index; and displaying the substring for the determined display duration.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. A method for displaying a string of text, the method comprising:
    dividing the string of text into a plurality of substrings; and
    for each substring of the plurality of substrings:
        determining a complexity index of the substring;
        determining a display duration of the substring based on the determined complexity index; and
        displaying the substring for the determined display duration, wherein the determined display duration of the substring is at least substantially proportional to the determined complexity index.

2. The method of claim 1, wherein the substring is displayed after a preceding substring has ceased to be displayed.

3. The method of claim 1, wherein each substring of the plurality of substrings comprises at least one word.

4. The method of claim 1, wherein dividing the string of text into the plurality of substrings comprises identifying words in the string of text.

5. The method of claim 4, wherein identifying words in the string of text comprises
    recognizing space symbols in the string of text;
    identifying strings of characters that are at least one of between two space symbols, between a start of the string of text and one space symbol, or between one space symbol and an end of the string of text; and
    classifying the identified strings of characters as words.

6. The method of claim 4, further comprising identifying phrases in the string of text, wherein each phrase comprises a plurality of identified words.

7. The method of claim 6, wherein identifying phrases in the string of text comprises matching successive identified words against predefined phrases in a language database.

8. The method of claim 1, wherein determining the complexity index of the substring comprises at least one of determining a number of characters in the substring, determining a frequency of occurrence of the substring in a database representing common language usage, and classifying the substring into a category out of a plurality of categories, the plurality of categories comprising at least one of academic vocabulary, technical vocabulary and common vocabulary.

9. The method of claim 8, wherein each category is associated with a respective complexity index.

10. The method of claim 1, further comprising:
determining a language of the string of text.

11. The method of claim 1, further comprising:
for each substring of the plurality of substrings:
modifying the determined display duration of the substring based on at least one of a preceding substring or a succeeding substring.

12. The method of claim 11, wherein modifying the determined display duration of the substring is based on at least one of a difference between a complexity index of the substring and a complexity index of the preceding substring, or a difference between the complexity index of the substring and a complexity index of the succeeding substring.

13. The method of claim 11, wherein modifying the determined display duration of the substring is based on at least one of a determined display duration of the preceding substring or the determined display duration of the succeeding substring.

14. The method of claim 13, wherein modifying the determined display duration of the substring comprises increasing a determined display duration when the difference between the determined display duration of the preceding substring and the determined display duration of the succeeding substring is more than a predetermined threshold.

15. The method of claim 1, wherein the plurality of substrings are successively displayed according to a sequence of the substrings within the string of text.

16. A wearable device comprising:
a processor configured to divide a string of text into a plurality of substrings,
wherein the processor is further configured to determine a complexity index of each substring of the plurality of substrings, and further configured to determine a display duration of each substring of the plurality of substrings based on a respective determined complexity index; and
a display configured to display each substring of the plurality of substrings for a respective determined display duration, wherein the respective determined display duration of the substring is at least substantially proportional to the respective determined complexity index.

17. The wearable device of claim 16,
wherein the processor is further configured to control the display to display each substring after a display duration of a preceding substring has ended.

18. The wearable device of claim 16, wherein the wearable device is one of a fitness tracker, an activity tracker, a health monitor, a watch, a communication device or a media player.

19. A non-transitory computer-readable medium comprising instructions which, when executed by a processor, causes the processor to perform a method for displaying a string of text, the method comprising:
dividing the string of text into a plurality of substrings; and
for each substring of the plurality of substrings:
determining a complexity index of the substring;
determining a display duration of the substring based on the determined complexity index; and
displaying the substring for the determined display duration wherein the determined display duration of the substring is at least substantially proportional to the determined complexity index.

* * * * *